United States Patent
Jayapal et al.

(10) Patent No.: US 11,863,503 B2
(45) Date of Patent: Jan. 2, 2024

(54) METHODS AND SYSTEMS FOR SUPPLEMENTING A MESSAGE

(71) Applicant: COMCAST CABLE COMMUNICATIONS, LLC, Philadelphia, PA (US)

(72) Inventors: Rameshkumar Ayyasamy Jayapal, Mount Laurel, NJ (US); Brett Sherman, Huntingdon Valley, PA (US); Raghavendra Hegde, Wayne, PA (US); Manoj Chaudhari, Dayton, NJ (US); Abuthalha Abdul Raheem, Jamesburg, NJ (US); Babu Thirumalai, Levittown, PA (US); Sathish Kumar Karunakaran, Chennai (IN)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/885,032

(22) Filed: May 27, 2020

(65) Prior Publication Data

US 2021/0377191 A1  Dec. 2, 2021

(51) Int. Cl.

| | |
|---|---|
| G06F 15/16 | (2006.01) |
| H04L 51/04 | (2022.01) |
| H04M 3/533 | (2006.01) |
| H04W 4/12 | (2009.01) |
| H04L 51/56 | (2022.01) |
| H04L 51/224 | (2022.01) |

(52) U.S. Cl.
CPC ............ H04L 51/04 (2013.01); H04L 51/224 (2022.05); H04L 51/56 (2022.05); H04M 3/533 (2013.01); H04W 4/12 (2013.01)

(58) Field of Classification Search
CPC ......... H04L 51/04; H04L 51/24; H04L 51/36; H04L 51/06; H04L 51/08; H04L 51/10; H04L 51/224; H04L 51/56; H04L 51/063; H04W 4/12; H04M 3/533; H04M 3/493; H04M 2203/301; H04M 3/42153; H04M 3/53366

See application file for complete search history.

(56) References Cited

U.S. PATENT DOCUMENTS

| | | | | |
|---|---|---|---|---|
| 7,966,373 B1* | 6/2011 | Smith | .................. | G06Q 10/107 |
| | | | | 709/206 |
| 2012/0323951 A1* | 12/2012 | Caruntu | .............. | G06F 16/3322 |
| | | | | 707/767 |
| 2014/0273979 A1* | 9/2014 | Van Os | ............. | H04M 3/53333 |
| | | | | 455/412.2 |
| 2016/0065524 A1* | 3/2016 | Umapathy | ............... | H04L 51/14 |
| | | | | 709/206 |
| 2018/0356957 A1* | 12/2018 | Desjardins | .............. | H04L 51/04 |
| 2021/0103610 A1* | 4/2021 | Lee | ......................... | G06F 16/45 |

* cited by examiner

*Primary Examiner* — John B Walsh
(74) *Attorney, Agent, or Firm* — Ballard Spahr LLP

(57) ABSTRACT

Methods and systems for modifying/supplementing a message are described. A computing device may receive a message from a user device that is intended for a recipient device. A user of the user device may create a message, such as a voicemail, by interacting with the computing device. The computing device may analyze the message in real-time as the user is interacting with the computing device and send, to the user device, one or more options for modifying/supplementing the message. The user of the user device may select one or more of the options and cause the computing device to modify/supplement the message accordingly.

22 Claims, 9 Drawing Sheets

METHODS AND SYSTEMS FOR SUPPLEMENTING A MESSAGE

BACKGROUND

When a user (e.g., a caller) attempts to contact another user (e.g., a callee) via a communication service, such as a phone call or a video call, and the callee is unavailable, the caller has the ability to create an electronic message, such as a voicemail, for the callee. The caller may interact the communication service, such as an interactive voice response system, when creating the electronic message. For example, the caller may be able to delete and re-create the electronic message, send the electronic message with a certain priority level, and other options relating to creation of the electronic message. However, when the caller creates and/or sends the electronic message, existing communication systems do not allow the caller does to supplement the electronic message with additional information. These and other considerations are discussed herein.

SUMMARY

It is to be understood that both the following general description and the following detailed description are exemplary and explanatory only and are not restrictive. Methods and systems for modifying/supplementing a message are described. A computing device may receive a message from a user device that is intended for a recipient device. For example, the user device may have attempted to communicate with the recipient device, but the communication failed. A user of the user device may create a message, such as a voicemail, by interacting with the computing device (e.g., using an interactive voice response system). The computing device may analyze the message in real-time as the user is interacting with the computing device and send, to the user device, one or more message options for modifying/supplementing the message. The user of the user device may select one or more of the message options and cause the computing device to modify/supplement the message accordingly. The computing device may relay/send, or otherwise make available, the modified message to the recipient device. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
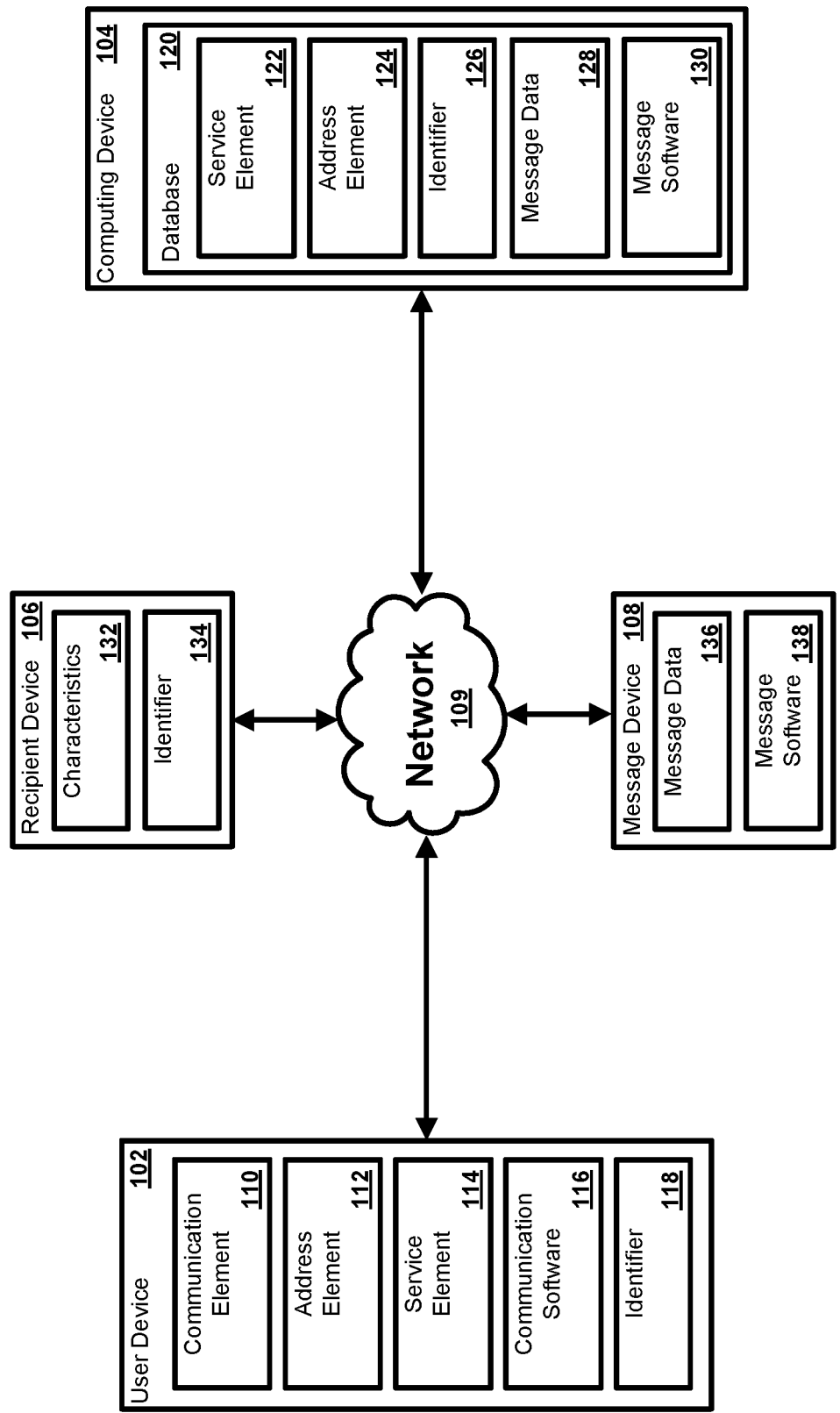
FIG. 1 shows an example system for supplementing a message.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Described herein are methods, systems, and apparatuses for modifying/supplementing a message. A computing device of a communication system, such as a telecommunications system, may be interacted with by a user of a user device to create a message intended for a recipient device. For example, the user device may have attempted to establish a communication session (e.g., a phone call, a video call, etc.) with the recipient device, such as by initiating a voice and/or video call. The communication may fail (e.g., time out) when the recipient device does not indicate to the communication system that the communication is accepted (e.g., by a user answering the phone and/or video call). As a result, the communication system may terminate the request for the communication session after a period of time (e.g., a timeout period) expires. When the communication system terminates the request for the communication session, a Call Forwarded Not Available ("CFNA") or a Call Forwarding Blocked ("CFB") request may be sent by the communication system to the computing device. The computing device may receive the CFNA/CFB request and provide an interactive voice response ("IVR") system that the user of the user device may interact with to create a message to be sent to the recipient device. The message may be an audio voicemail, a video voicemail, and/or the like. The message created by the user of the user device may be sent by the computing device to the recipient device without any supplementation (e.g., added auditory or imagery features).

As an example, the message may be supplemented with one or more message options before being sent to the recipient device. The one or more message options may include a plurality of auditory or imagery features that may be used to modify/supplement the message, such as sounds, songs, effects, pictures, image filters, etc. The IVR system and/or the computing device may provide the one or more message options to the user of the user device before the message is sent to the recipient device. For example, the IVR system and/or the computing device may analyze the message in real-time (e.g., as the user is speaking and/or gesturing) and provide the one or more message options to the user device via the IVR system. The one or more options may be provided as a plurality of phrases/titles (e.g., "Play a song," "Add effects," "Add sounds," etc.). The one or more message options may be associated with a number such that the user of the user device may select at least one of the one or more message options using a keypad of the user device (e.g., a number is pressed using the keypad).

The computing device may select the one or more message options from a plurality of message options stored in a database. For example, the one or more message options ultimately provided to the user of the user device may be based on a context and/or content of the message. The context and/or content of the message may be words, phrases, voice tones, gestures (for video calls), etc., that may be determined by the computing device using natural language processing, machine learning, and/or artificial intelligence methods as described herein. The computing device may use the context and/or content of the message to determine which of the plurality of message options stored in the database are the most relevant to the message (e.g., the message options most likely to be of interest to the user). The computing device may provide a quantity of the most relevant message options to the user as one or more suggested message options (e.g., one or more suggested modifications). The user of the user device may select at least one of the one or more suggested message options to modify/supplement the message using the IVR system. The computing device may receive the user's selection(s) made from the one or more suggested message options to modify/supplement the message accordingly. For example, the message may be modified with a background sound, song, and/or image; a series of sounds and/or images at various points in the message; an effect/filter; one or more thereof, and/or the like. The computing device may send the modified message to the recipient device.

FIG. 1 shows an example system 100 for modifying/supplementing a message. Those skilled in the art will appreciate that digital equipment and/or analog equipment may be employed. One skilled in the art will appreciate that provided herein is a functional description and that the respective functions may be performed by software, hardware, or a combination of software and hardware.

The system 100 may include a user device 102, a computing device 104, a recipient device 106, and a message device 108. The user device 102 may communicate with the computing device 104, the recipient device 106, and/or the message device 108 via a network 109. The network 109 may support communication between the user device 102, the computing device 104, the recipient device 106, and/or the message device 108 via a short-range communications (e.g., BLUETOOTH®, near-field communication, infrared, Wi-Fi, etc.) and/or via a long-range communications (e.g., Internet, cellular, satellite, and the like). For example, the network 109 may utilize Internet Protocol Version 4 (IPv4) and/or Internet Protocol Version 6 (IPv6). The network 109 may be a telecommunications network, such as a mobile, landline, and/or Voice over Internet Protocol (VoIP) provider.

The user device 102 may include a communication element 110, an address element 112, a service element 114, communication software 116, and an identifier 118. The communication element 110 may be configured to communicate via any network protocol. For example, the communication element 110 may communicate via a wired network protocol (e.g., Ethernet, LAN, WAN, etc.) on a wired network (e.g., the network 109). The communication element 110 may include a wireless transceiver configured to send and receive wireless communications via a wireless network (e.g., the network 109). The wireless network may be a Wi-Fi network. The user device 102 may communicate with the computing device 104, the recipient device 106, and/or the message device 108 via the communication element 110.

The user device 102 may be a mobile device, such as a smartphone, or a telephone. The communication element 110 of the user device 102 may be configured to communicate via one or more of second generation (2G), third generation (3G), fourth generation (4G), fifth generation (5G), GPRS, EDGE, D2D, M2M, long term evolution (LTE), long term evolution advanced (LTE-A), code division multiple access (CDMA), wideband code division multiple access (WCDMA), universal mobile telecommunications system (UMTS), wireless broadband (WiBro), Voice Over IP (VoIP), and global system for mobile communication (GSM). The communication element 110 of the user device 102 may further be configured for communication over a local area network connection through network access points using technologies such as IEEE 802.11.

The user device 102 may include an address element 112 and a service element 114. The address element 112 may include or provide an internet protocol address, a network address, a media access control (MAC) address, an Internet address (e.g., an IPv4, an IPv6 address, etc.), or the like. The address element 112 may be used to establish a communication connection between the user device 102, the computing device 104, the recipient device 106, the message device 108, and/or other devices and/or networks. The address element 112 may be an identifier or locator of the user device 102. The address element 112 may be persistent for a particular network (e.g., the network 109).

The service element 114 may include an identification of a service provider associated with the user device 102 and/or with the class of user device 102. The class of the user device 102 may be related to a type of device, capability of device, type of service being provided, and/or a level of service (e.g., business class, service tier, service package, etc.). The service element 114 may include information relating to or provided by a service provider (e.g., Internet service provider, content service provider, communications service provider, etc.) that may provide or enable data flow such as communication services (e.g., a phone call, a video call, etc.) and/or content services to the user device 102. The service element 114 may include information relating to a preferred service provider for one or more particular services relating to the user device 102. The address element 112 may be used to identify or retrieve data from the service element 114, or vice versa. One or more of the address element 112 and/or the service element 114 may be stored remotely from the user device 102. Other information may be represented by the service element 114.

The user device 102 may be associated with a user identifier or device identifier 118. The device identifier 118 may be any identifier, token, character, string, or the like, for differentiating one user or user device (e.g., the user device 102) from another user or user device. For example, the device identifier 118 may be or relate to an Internet Protocol (IP) Address, a Media Access Control (MAC) address, an International Mobile Equipment Identity (IMEI) number, an International Mobile Subscriber Identity (IMSI) number, a phone number, a SIM card number, and/or the like. The device identifier 118 may identify a user or user device as belonging to a particular class of users or user devices. The device identifier 118 may include information relating to the user device 102 such as a manufacturer, a model or type of device, a service provider associated with the user device 102, a state of the user device 102, a locator, and/or a label or classifier. Other information may be represented by the device identifier 118.

The user device 102 may include communication software 118. The communication software 118 may be software, firmware, hardware, and/or a combination of software, firmware, and hardware. The communication software 118 may allow the user device 102 to communicate with one or more devices. The communication software 118 may be configured to send and/or receive data, communication services (e.g., a phone call, a video call, etc.), and so forth. For example, the communication software 118 may be configured to allow the user device 102 to establish a communication connection and/or a communication session with the recipient device 106 via the network 109. The recipient device 106 may be a mobile device, such as a smartphone, or a telephone. The recipient device 106 may be configured to communicate via one or more of second generation (2G), third generation (3G), fourth generation (4G), fifth generation (5G), GPRS, EDGE, D2D, M2M, long term evolution (LTE), long term evolution advanced (LTE-A), code division multiple access (CDMA), wideband code division multiple access (WCDMA), universal mobile telecommunications system (UMTS), wireless broadband (WiBro), Voice Over IP (VoIP), and global system for mobile communication (GSM). The recipient device 106 may further be configured for communication over a local area network connection through network access points using technologies such as IEEE 802.11. For example, the communication software 118 may be configured to establish a phone call and/or a video call with the recipient device 106. As an example, the communication software 118 may be configured to communicate with the message device 108 to leave one or more messages for another device (e.g., the recipient device 106) if the communication connection and/or the communication session is not established with the other device.

The computing device 104 may include a database 120, a service element 122, an address element 124, an identifier 126, message data 128, and message software 130. The computing device 106 may manage the communication between the user device 102, the recipient device 106, the message device 108, and/or a database 120 for sending and receiving data therebetween. The database 120 may store a plurality of files (e.g., web pages), user identifiers or records, data associated with a plurality of devices, data associated with a plurality of messages, data associated with a plurality of options to modify/supplement the messages, supplemental data, and/or other information. The user device 102, the recipient device 106, and/or the message device 108 may request and/or retrieve a file from the database 120. The database 120 may store information relating to the user device 102 such as the address element 112 and/or the service element 114. The computing device 104 may obtain the device identifier 118 from the user device 102 and retrieve information from the database 120. The computing device 104 may assign the identifier 118 to the user device 102. Any information may be stored in and retrieved from the database 120. The database 120 may be disposed remotely from the computing device 104 and accessed via direct or indirect connection. The database 120 may be integrated with the computing device 104 or some other device or system.

The computing device 104 may have a service element 122. The service element 122 may include an identification of a service provider associated with the computing device 104 and/or with the class of computing device 104. The class of the computing device 104 may be related to a type of device, capability of device, type of service being provided, and/or a level of service (e.g., business class, service tier, service package, etc.). The service element 122 may include information relating to or provided by a communication service provider (e.g., Internet service provider, communications service provider, etc.) that is providing or enabling data flow such as communication services to the computing device 104. The service element 122 may include information relating to a preferred service provider for one or more particular services relating to the computing device 104. Other information may be represented by the service element 122.

The address element 124 may include or provide an internet protocol address, a network address, a media access control (MAC) address, an Internet address, or the like. The address element 124 may be relied upon to establish a communication session between the computing device 104 and the user device 102, the recipient device 106, and/or the message device 108, or other devices and/or networks. The address element 124 may be used as an identifier or locator of the computing device 104. The address element 124 may be persistent for a particular network.

The computing device 104 may have an identifier 126. The identifier 126 may be or relate to an Internet Protocol (IP) Address, a Media Access Control (MAC) address, or the like. The identifier 126 may be a unique identifier for facilitating wired and/or wireless communications with the user device 102, the recipient device 106, and/or the message device 108. The identifier 126 may be associated with a physical location of the computing device 104.

The computing device 104 may store message data 128 in the database 120. The message data 128 may include any data associated with a message sent by a device (e.g., the user device 102, the computing device 104, the recipient device 106, and/or the message device 108. For example, the message may be a voicemail or a video voicemail, and the message data 128 may include audio and/or video data associated with the message. The message data 128 may include information associated with a device that the message (e.g., the user device 102), as well as an intended recipient of the message (e.g., the recipient device 106).

The message data 128 may include contextual data associated with the message. For example, the computing device 104 may analyze language of the message to determine context for one or more words of the message. As further described herein, the computing device may utilize natural language processing to determine the contextual information associated with the message. The contextual information may include at least one of a location of the user, a time associated with the message, a date associated with the message, the intended recipient of the message, a subject of the message, or a context associated with the message. The computing device 104 may store the contextual information as message data 128.

The message data 128 may include a plurality of options to modify/supplement the message. The plurality of options may include a plurality of modifications. For example, the plurality of options may include modification of audio associated with the message, addition of a song to the message, or execution of an action based on the message. The message data 128 may include historical data that indicates a plurality of previously received messages from a plurality of user device. For example, the message data 128 may include information associated with a specific message, whether a user associated with the message supplemented the message with additional information, and the option the user selected to modify/supplement the message with.

The computing device 104 may include message software 130. The message software 130 may determine one or more suggested options (e.g., one or more suggested modifications) of a plurality of options for modifying/supplementing the message. For example, the message software 130 may rank the plurality of options to indicate the option(s) (e.g., modification(s)) most likely to be selected by a user of the user device 102. The one or more suggested options may be determined based on data (e.g., the message data 128) associated with a plurality of previously selected options. For example, the message software 130 may utilize historical data that indicates a plurality of previously received messages from a plurality of user devices, as well as the options that the plurality of user devices selected.

The message software 130 may determine/generate a supplemental message that incorporates a message option selected by the user of the user device 102. For example, the message software 130 may receive data from the user device 102 that indicates a message option that the user of the user device 102 would like to modify (e.g., supplement) the message with. The message software 130 may determine/generate the supplemental message (e.g., modify the message) based on the message option that the user of the user device 102 selects. For example, the message software 130 may modify the message sent by the user device 102 to include supplemental information associated with the message option that the user of the user device 102 selects, as described further herein.

The computing device 104 may be interacted with by the user of a user device 102 when creating a message intended for the recipient device 106. For example, the user device 102 may have attempted to establish a communication session (e.g., a phone call, a video call, etc.) with the recipient device 106, such as by initiating a voice and/or video call. The communication may fail (e.g., time out) when the recipient device 106 does not indicate to the network 109 that the communication is accepted (e.g., by a user answering the phone and/or video call). As a result, the network 109 may terminate the request for the communication session after a period of time (e.g., a timeout period) expires. When the network 109 terminates the request for the communication session, a Call Forwarded Not Available ("CFNA") or a Call Forwarding Blocked ("CFB") request may be sent by the network 109 to the messaging device 108. The messaging device 108 may receive the CFNA/CFB request and provide an interactive voice response ("IVR") system that the user of the user device 102 may interact with to create a message to be sent to the recipient device 106. The message may be an audio voicemail, a video voicemail, and/or the like. The message created by the user of the user device 102 may be sent via the messaging device 108 and/or the computing device 104 to the recipient device 106 without any supplementation (e.g., added auditory or imagery features).

As an example, the message software 130 may analyze the message to determine contextual information associated with the message and one or more message options for modifying/supplementing the message. The message may be supplemented with the one or more message options before being sent to the recipient device 106. The one or more message options may include a plurality of auditory or imagery features that may be used to modify/supplement the message, such as sounds, songs, effects, pictures, image filters, etc. The messaging device 108 and/or the computing device 104 may provide the one or more message options to the user of the user device 102 before the message is sent to the recipient device 102. For example, the messaging device 108 and/or the computing device 104 may analyze the message in real-time (e.g., as the user is speaking and/or gesturing) and provide the one or more message options to the user device 102 via the messaging device 108. The one or more message options may be provided as a plurality of phrases/titles (e.g., "Play a song," "Add effects," "Add sounds," etc.). The one or more message options may be associated with a number such that the user of the user device 102 may select at least one of the one or more message options using a keypad of the user device (e.g., a number is pressed using the keypad). The computing device 104 may select the one or more message options from a plurality of message options stored in the database 120. For example, the one or more message options ultimately provided to the user of the user device 102 may be based on a context and/or content of the message. The context and/or content of the message may be words, phrases, voice tones, gestures (for video calls), etc., that may be determined by the messaging device 108 and/or the computing device 104 using natural language processing, machine learning, and/or artificial intelligence methods as described herein.

For example, the message from the user device 102 may include the phrase "Happy Birthday!" The message software 130 may determine one or more options to modify/supplement the message based on the phrase "Happy Birthday!" occurring within the message. For example, the message software 130 may be used by the computing device 104 to determine one or more sounds that may be appropriate to modify/supplement the message with, such as the happy birthday song, a party sound, a sound of confetti popping, and so forth. The message software 130 may be used by the computing device 104 to send the one or more options (e.g., the aforementioned sounds) to the user device 102 to allow the user of the user device 102 to determine whether the user of the user device 102 would desire to modify/supplement the message. The message software 130 may receive a selection of one of the options from the user device 102. For example, the user of the user device 102 may indicate that the user of the user device 102 desires the song "Happy Birthday" to be played with the message. The song may be played before, during, or after the message is played at the recipient device 106. The message software 130 may modify the message to include supplemental data and/or information (e.g., the song "Happy Birthday"). The message software 130 may send the modified message to the recipient device 106. After receiving the supplemented message, or otherwise accessing the supplemented message, the recipient device 106 may playback the supplemented message to a user of the recipient device 106.

The recipient device 106 may include a user device 102. Accordingly, the recipient device 106 may include the same capabilities as the user device 102. The recipient device 106 may include characteristics 132. The characteristics 132 may indicate information associated with the recipient device 106. For example, the characteristics 132 may include a type of the recipient device 106, a manufacturer of the recipient device 106, hardware capabilities of the recipient device 106, an account associated with the recipient device 106, and/or a user associated with the recipient device 106.

The supplemented message sent to the recipient device 106, or otherwise accessed by the recipient device 106, may be a rich communication. The rich communication may provide additional information as compared to a standard communication. For example, the rich communication may provide information associated with context of the message such as a location associated with the message (e.g., the location of the user device), a date and/or time associated with the message, and so forth. For example, the rich communication may include the message as-modified with a background sound, song, and/or image; a series of sounds and/or images at various points in the message; an effect/filter; one or more thereof, and/or the like. The recipient device 106 may receive the rich communication and may respond to the rich communication.

The recipient device 106 may be associated with a user identifier or device identifier 134. The device identifier 134 may be any identifier, token, character, string, or the like, for differentiating one user or computing device (e.g., the recipient device 106) from another user or computing device. For example, the device identifier 134 may be or relate to an Internet Protocol (IP) Address, a Media Access Control (MAC) address, an International Mobile Equipment Identity (IMEI) number, an International Mobile Subscriber Identity (IMSI) number, a phone number, a SIM card number, and/or the like. The device identifier 134 may identify a user or computing device as belonging to a particular class of users or computing devices. The device identifier 134 may include information relating to the recipient device 106 such as a manufacturer, a model or type of device, a service provider associated with the recipient device 106, a state of the recipient device 106, a locator, and/or a label or classifier. Other information may be represented by the device identifier 134.

The message device 108 may be a voicemail device and/or a video voicemail device configured to record voicemails and/or video voicemails from the user devices 102. The message device 108 may be a local component of the user device 102, the recipient device 106, and/or the computing device 106, or the message device 108 may be a separate component/device independent of the user device 102, the recipient device 106, and the computing device 106. The message device 108 may include message data 136 and message software 138. The message data 136 may include all of the same information, data, and/or capabilities of the message data 128. The message software 138 may establish a communication connection with the user device 102. After the user device 102 establishes the communication connection with the message software 138, the user device 102 may send a message to the message software 138. For example, the user device 102 may attempt to establish a communication session and/or a communication connection with the recipient device 106, but the user device 102 failed to establish the communications because the recipient device 106 did not respond. The user device 102 may provide the message software 138 with a message that the user of the user device 102 desires to deliver to the recipient device 106. The message software 138 may send (e.g., provide) the message to the recipient device 106.

The message software 138 may send the message to the computing device 104. As described herein, the computing device 104 may analyze the message created by/sent by the user device 102 to determine contextual information associated with the message. The computing device 104 may use the context and/or content of the message to determine which of a plurality of message options stored in the database 120 are the most relevant to the message (e.g., the message options most likely to be of interest to the user of the user device 102). The computing device 104 may provide a quantity of the most relevant message options to the user of the user device 102 as one or more suggested message options (e.g., one or more suggested modifications). For example, the computing device 104 may send an indication and/or a notification to the message software 138 to determine if the user of the user device 102 desires to modify/supplement the message. The message software 138 may send the indication and/or notification received from the computing device 104 to the user device 102. For example, the message software 138 may send the one or more suggested message options to modify/supplement the message to the user device 102. The one or more suggested message options to modify/supplement the message may be based on historical data. For example, the one or more suggested message options may be a ranked list that is ordered based on the message options that are determined as being the most likely to be selected by the user of the user device 102 based on the content and/or context of the message. Selection by the computing device 104 using the message software 130 of the one or more suggested message options is described further herein with respect to FIG. 3.

The message software 138 may receive an indication of a selection of at least one of the one or more suggested message options to modify/supplement the message from the user of the user device 102. For example, after receiving the one or more options from the message software 138, the user of the user device 102 may indicate (e.g., via an input) that the user would like to modify/supplement the message with at least one of the one or more suggested message options. The user of the user device 102 may select at least one of the one or more suggested message options to modify/supplement the message using the IVR system provided by the messaging device 108. The computing device 104 may receive the user's selection(s) made from the one or more suggested message options to modify/supplement the message accordingly. The message software 138 may send the indication of the selection of the at least one of the one or more suggested message options to modify/supplement the message to the computing device 104.

The computing device 104 may perform the selected suggested message option(s) to modify/supplement the message, and the computing device 104 may send the supplemented message to the message software 138. The message software 138 may provide the supplemented message to the user device 102, or otherwise provide access thereto. The message software 138 may receive an indication as to whether or not the user of the user device 102 accepts the supplemented message from the user device 102. If the user device 102 does not accept the supplemented message, the message software 138 may indicate that to the computing device 104. For example, the message software 138 may send data, a message, a notification, and so forth to the computing device 104 to indicate the user device 102 did not accept the supplemented message.

The message software 138 may receive one or more additional options for modifying/supplementing the message from the computing device 104, and the message software 138 may provide the one or more additional options to the user of the user device 102. If the user of the user device 102 accepts the supplemented message, the message software 138 may send an indication to the computing device 104 that the user of the user device 102 accepted the supplemental message 104. The message software 138 may receive the supplemented message from the computing device 104. The message software 138 may send the supplemented message to the recipient device 106, or otherwise provide access thereto. After receiving the supplemented message, or otherwise accessing the supplemented message, the recipient device 106 may playback the supplemented message to a user of the recipient device 106.

Figure 2:
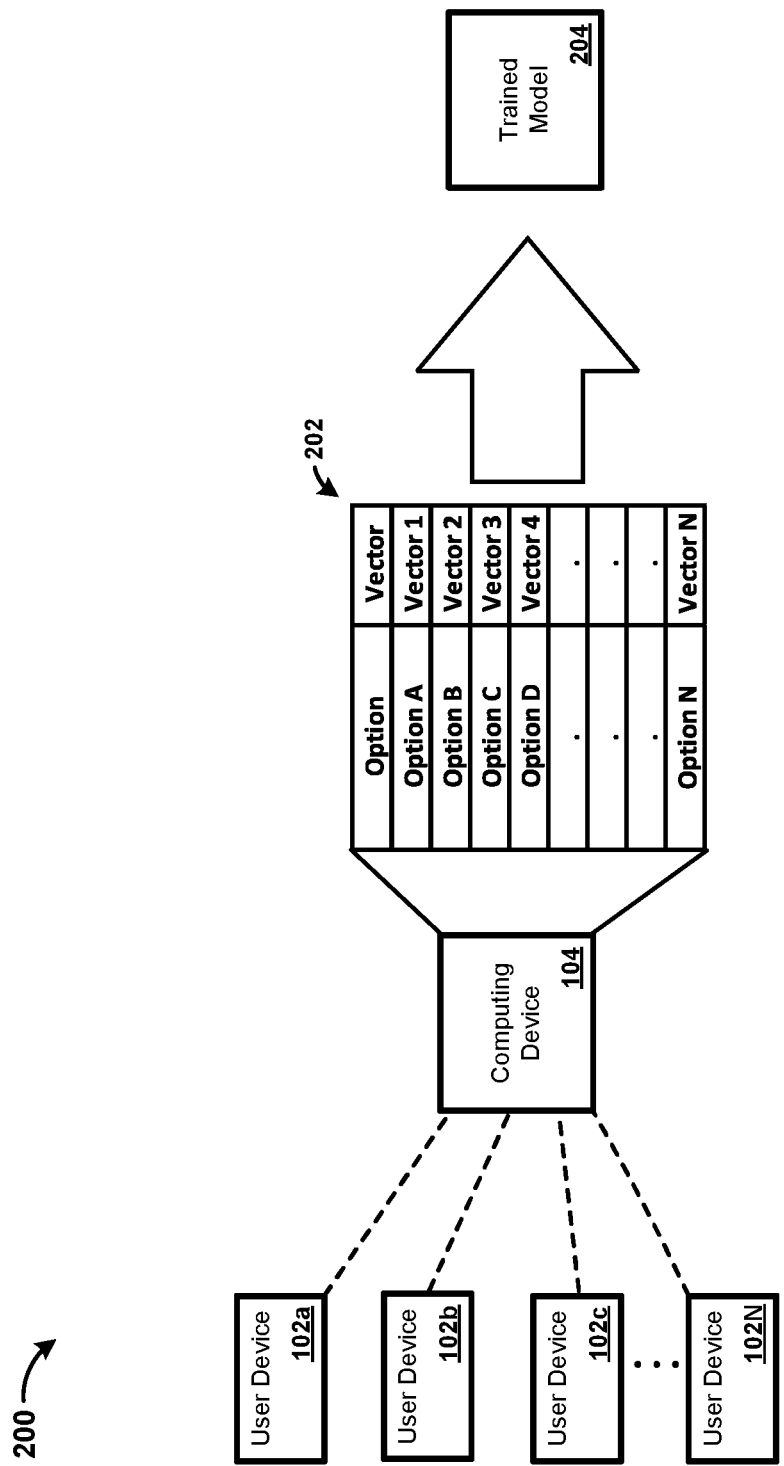
FIG. 2 shows an example system for supplementing a message.

FIG. 2 shows an example system 200 for machine learning. The system 200 may include a plurality of user devices 102 that may provide data to the computing device 108. For example, users of each of the user devices 102 may desire to modify/supplement a message, and each of the user devices 102 may be known devices so that a training data set 202 may be created based on the selections made by the users of the user devices 102 when supplementing a message. Each of the user devices 102 may have one or more characteristics and/or labels associated with the user devices 102. Each of the user devices 102 may be associated with a message generated using the user devices 102 and stored at the database 120. Each message may have been 102 sent (e.g., by the computing device 104) to a respective recipient device (e.g., the recipient device 106). Additionally, information (e.g., data) of a user associated with each of the user devices 102 may be known (hereinafter, "user information"). For example, the user information may include demographic information, location information, and/or one or more selections of an option to modify/supplement a message.

The user information may be determined by the computing device 104 using message data associated with each message generated using the user devices 102. The user information may be used to determine a probability that a user of an unknown user device 102 will select a specific option (e.g., a modification) of a plurality of options (e.g., a plurality of modifications) to modify/supplement a new message. The probability may be based on message data associated with the new message and one or more association rules, as further described herein. The probability may have one or more coefficients associated with the probability. The coefficients may be added to a vector associated with each known user device 102, as well as any characteristics associated with each message, known user, and/or known user device 102. For example, the user devices 102 may be known user devices because each user device 102 is associated with an existing message that a user had previously requested to modify/supplement, and the option that each user of each user device 102 selected regarding supplementing the message was previously known. Accordingly, the training data set 202 has a plurality of characteristics associated with a plurality of vectors for the plurality of known user devices 102a-N. The training data set 202 may be utilized in a first stage of machine learning to produce a trained model 204.

Figure 3:
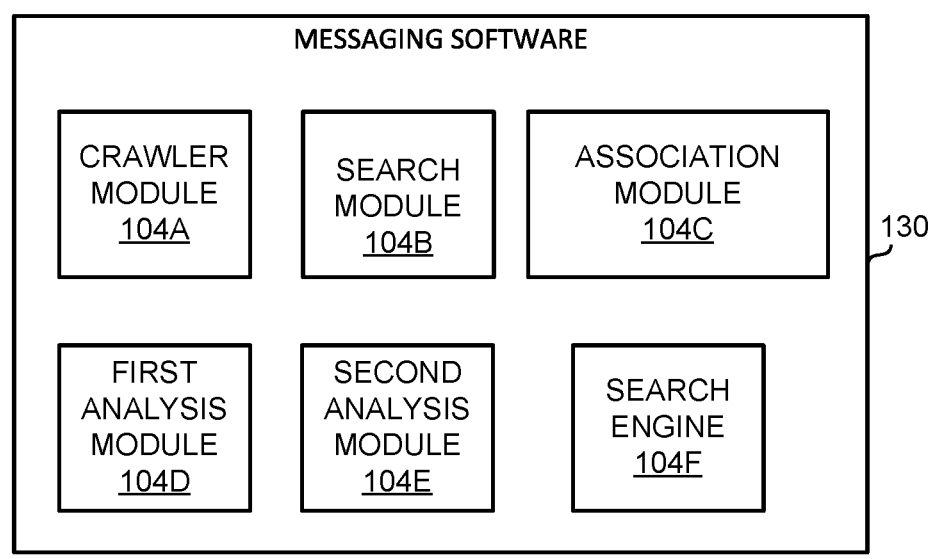
FIG. 3 shows a block diagram of example modules for supplementing a message.

FIG. 3 is a block diagram depicting an example view of the messaging software 130 of the computing device 104. The messaging software 130 of the computing device 104 may include one or more of a crawler module 104A, a search module 104B, an association module 104C, a first analysis module 104D, a second analysis 104E, and a search engine 104F. The computing device 104 may receive data associated with a plurality of training messages associated with the one or more user devices 102. For example, the plurality of training messages may include message data and user data for each message. The message data may include one or more words included within the message. The user data may include demographic information, location information, and/or one or more selections of an option to modify/supplement a message (hereinafter, "message options"). The crawler module 104A of the messaging software 130 of the computing device 104 may determine/generate the training data set 202 using the plurality of training messages. The computing device 104 may determine one or more coefficients associated with attributes of the message data and/or the user information with respect to one or more of the message options. 102. The coefficients may indicate a probability that a user associated with a new message generated using a user device 102 is to select a specific option of the message options to modify/supplement the new message.

The crawler module 104A may retrieve and analyze the plurality of training messages. The crawler module 104A may analyze the message data and/or user information associated with each message to determine how to index the message (e.g., based on an option(s) of the message options selected). The message data for a given training message may contain message data and/or user information (e.g., attributes associated with one or more users, such as a caller and/or a callee). The user information may include, but is not limited to, address, city, state, area code, time, a combination thereof and the like. The crawler module 104A may index the plurality of training messages based on the user information.

The first analysis module 104D may be used for natural language processing, contextual analysis, etc. The first analysis module 104D may receive the plurality of training messages and analyze the message data associated with each training message. For example, the first analysis module 104D may determine one or more words (e.g., spoken by the user who generated the message) indicated by the message data. The first analysis module 104D may convert the one or more words of each training message into textual information. The textual information may be input into the first analysis module 104D, and the first analysis module 104D may determine/generate a cognitive model of each training message. In other words, a training message may include message data indicative of natural language that may be parsed into a representation format of first-order logic and naive semantics. The first analysis module 104D may use a naive semantic system that incorporates modules for text processing based upon parsing, formal semantics, and discourse coherence, as well as relying on a naive semantic lexicon that stores word meanings in terms of a hierarchical semantic network. The first analysis module 104D may use a high recall statistical retrieval module (not shown) using unspecified statistical techniques to produce a list of words and a relevance reasoning module (not shown) which may use first-order theorem proving and human-like reasoning to determine which message option(s) should be suggested to a user given a particular usage of a certain word or words. The textual information may be based on sentence structure, for example, based on a word-by-word analysis, and/or a whole sentence analysis. The first analysis module 104D may determine word frequencies for some or all words contained in the textual information. The first analysis module 104D may be configured to disambiguate and resolve homograph issues to accurately identify words and their frequencies.

The second analysis module 104E may be used for natural language processing, contextual analysis, etc. For example, the second analysis module 104E may be configured for performing a concept-based method for searching text information (e.g., contained within the plurality of training messages) based on an ontology. The second analysis module 104E may interact with the first analysis module 104D to transform natural language into predicate structures representing logical relationships between words in the natural language. The second analysis module 104E may include one or more ontologies and/or thesauri containing lexical semantic information about words and may be configured for ranking a set of matching natural language query predicate structures and equivalent textual information predicate structures. The second analysis module 104E may provide a logical representation and/or a semantic representation for all of the message data associated with a training message. In an aspect, such a logical representation and/or a semantic representation may be referred to herein as a data profile. A thesaurus may be a structured controlled vocabulary. The thesaurus may provide information about each term and its relationships to other terms within the same thesaurus. In addition to specifying which terms may be used as synonyms, the thesaurus also indicates which terms are more specific (e.g., narrower terms), which are broader, and which are related terms. An ontology is set of concepts with attributes and relationships between the various concepts that contain various meanings, all to define a domain of knowledge, and is expressed in a format that is machine-readable. Certain applications of ontologies, as used in artificial intelligence, may define a domain of knowledge through terms and relationships.

The second analysis module 104E may determine/generate one or more data profiles, optionally in conjunction with the first analysis module 104D. A data profile may include a list of concepts and/or terms and their associated relevance weights with respect to a message option(s) selected. A weight may indicate an importance of a concept/term with regard to other concepts/terms and a message option. The weights may represent, for example, the frequency with which the concepts occur in textual information, the specificity of the concepts, statistical characteristics of each concept, and the like. Statistical characteristics of concepts may include, without limitation, the specificity, the sensitivity, the number of alternatives occurring in the textual information, the textual similarity, and the like.

The second analysis module 104E and/or the first analysis module 104D may determine a weight for a concept/term in the plurality of training messages by calculating a number of occurrences (e.g., a frequency) of all concepts/terms (e.g., words, phrases, etc.). A correction algorithm may reduce the weight of concepts/terms that occur in many training messages. For example, if a training message is indexed, a very generic term like "the" will not be very informative while a term like "birthday" is very specific and more informative for determining a weight of a message option to associate with the word. Therefore, if the frequency of the term "the" in a document is higher than the frequency of the term "birthday," then the term "birthday" would have higher weight after correction.

The second analysis module 104E and/or the first analysis module 104D may determine/generate a data profile based on a training message and/or one or more association rules. The resulting data profile may be used to identify one or more of the message options based on a comparison between a message's data profile and data profiles of potential message options. For example, an amount of overlap between the message's data profile and the data profiles of potential message options may identify relevant message options to suggest. A similarity score may be generated that reflects a similarity between a message's data profile and the data profiles of potential message options. Determining a similarity score amongst a plurality of data profiles may include performing a matching algorithm. Performing a matching algorithm may include storing each data profile as a vector (e.g., training data set 202) and performing a vector matching algorithm. For example, a data profile may be stored mathematically as a vector with values between 0 and 1. The matching of a message's data profile with a stored data profile may be accomplished via vector matching. A variety of algorithms may be used to calculate the distance between the vectors. In an example, the various algorithms for determining the distance between vectors may include, but are not limited to, Vector algorithm, Portal algorithm, Quadsum algorithm, Jaccard algorithm, Dice algorithm, Basic algorithm, Weighted algorithm, Orion algorithm, Weighted Overlap algorithm, and the like. It is contemplated that one or more of these algorithms may be used concurrently.

The analysis performed by the second analysis module 104E and/or the first analysis module 104D using the training messages (e.g., the weights, data profiles, etc.) may be provided to the association module 104C. The association module 104C may be configured to generate one or more association rules based on the analysis performed by the second analysis module 104E and/or the first analysis module 104D. For example, the association module 104C may determine/generate an association rule for a given pairing of a word (e.g., birthday), a message option (e.g., supplementing a message with the Happy Birthday song), and/or a user information attribute (e.g., time of message). The association rule may be used to determine a probability that a user associated with a new message may select one or more of the message options (e.g., based on the message data associated with the new message and one or more association rules). The association module 104C may use the one or more association rules to train the trained model 204 for analysis of one or more new messages.

The trained model 204 may be classifier model (e.g., a Support Vector Machine (SVM), a logistic regression, a decision tree, a random forest, a neural network, etc.). A separate classifier may be trained for each characteristic to be determined for the user device 102 and/or the user of the user device 102. As an example, a unified multi-task classifier (e.g., a multiple layer perceptron with hidden layers and multiple output variables) may be trained to predict all these characteristics and/or labels simultaneously. Any type of classifier may be used (e.g., a neural network with more hidden layers, a linear classifier, a random forest, etc.). Any suitable standard machine learning algorithm may be used. The classifier's parameters may be optimized (e.g., finding parameter values that will give accurate predictions).

The association module 104C may use the one or more association rules and one or more of the classifiers and/or classifier models discussed above to train to the trained model 204. The trained model 204 may determine a probability of selecting a specific option of the message options for a new message not associated with any of the user devices 102 (e.g., an unknown user device) based on one or more of the message data associated with the new message, data associated with the unknown user device, and/or the user information determined based on the message data. The trained model 204 may receive as input the message data for the new message, and a probability (or probabilities) (e.g., output) that may indicate one or more selections of the message options the user associated with the new message is likely to select when generating the new message (e.g., recording via an IVR system).

For example, the new message may be determined to include the words "Happy New Year." The trained model 204 may use the search module 104B when determine one or more suggested message options (e.g., one or more suggested modifications) based on the message data associated with the new message. The search module 104B may be configured to perform one or more types of searches based on the message data associated with the new message. The message data may be used by the search module 104B to return one or more message options the user of the unknown user device is likely to select to modify/supplement the new message. The search module 104B may use the search engine 104F to perform the one or more searches. The search engine 104F may include a database listing comprising, for example, each of the message options that are available to select, referred to herein as search results. The search engine 104F may be configured to maintain a listing of data profiles and/or the one or more association rules. Searching by the search engine 104F may utilize metadata. For example, the metadata may include performing a Boolean search based on the message data (e.g., one or more spoken words, speech pattern(s), etc.). Searching by metadata may include performing a search by determining a deviation of a metadata value from a specified value and expressing the deviation in a relevance score. Searching by vector matching may include performing a vector matching algorithm as described herein. Searching by metadata and by vector matching may be performed simultaneously or sequentially.

The one or more searches may also include a keyword, a phrase, a name, combinations thereof, and/or the like. The search module 104B may be configured to perform a keyword search and/or a semantic search. A keyword search is a type of search that looks for matching vectors and/or association rules that contain one or more words specified by the message data. A semantic search seeks to improve search accuracy by understanding contextual meaning of terms as they appear in the message data to generate more relevant results. For example, a semantic search technique may be used to build a semantic model from a set of vectors and/or association rules, and to find the set of vectors and/or association rules that best relate to that query. An inverted index of all words in a vector and/or association rule across all vectors and/or association rules may be built, and then using various relevancy metrics, the words of the search may be compared against the inverted index, and a ranked set of vectors and/or association rules may be identified that are "closest" to the search terms. The search module 104B may interact with one or more of the first analysis module 104D and/or the second analysis module 104E to effect a semantic search. For example, the search module 104B may parse the new message and use the first analysis module 104D and/or the second analysis module 104E to develop a list of other related terms, concepts, and/or contexts that may correlate to one or more vectors and/or association rules. The search module 104B may determine/generate related terms and/or concepts that relate to a search type using, for example, an ontology. The related terms and/or concepts may be used to expand the search to identify vectors and/or association rules that are relevant to the search (e.g., relevant to the words indicated by the message data).

One or more suggested message options (e.g., one or more suggested modifications) that the user of the unknown user device may be likely to select to modify/supplement the new message may be returned by the search module 104B based on the one or more searches conducted. The search module 104B may provide the one or more suggested message options to the trained model 204. The trained model 204 may determine based on the one or more suggested message options that the user of the unknown user device may desire to modify/supplement the new message with sounds that are associated with "Happy New Year." For example, the trained model 204 may determine one or more suggested message options, such as adding sounds of fireworks, a song, "Happy New Year," a group of people cheering "Happy New Year," and/or other celebratory sounds associated with New Years to the background and/or the foreground of the new message. The trained model 204 may send (e.g., provide by the IVR system) the one or more suggested message options to the user of the unknown user device 102 so that the user may determine whether he or she desires to modify/supplement the message with any of the one or more suggested message options.

The trained model 204 may be optimized based on a selection of the one or more suggested message options made by the user of the user device 102. For example, the user of the user device 102 may receive the one or more suggested message options at the user device 102 and select at least one of the suggested options. The user device 102 may provide the computing device 104 with an indication of the at least one suggested option. The association module 104C may use the indication of the at least one suggested option to optimize one or more of the association rules that are associated with the at least the suggested option. For example, the at least one suggested option may be to play a song. The song may be associated with one or more of the association rules, which may be optimized based on the message data (e.g., words spoken) associated with the message. In this way, the one or more association rules may be optimized each time the trained model 204 is used to analyze a new message.

While the computing device 104 is shown as being separate from the trained model 204, the computing device 104 may include the capabilities of the trained model 204. Stated differently, the computing device 104 may be configured to use the machine learning described above.

Figure 4:
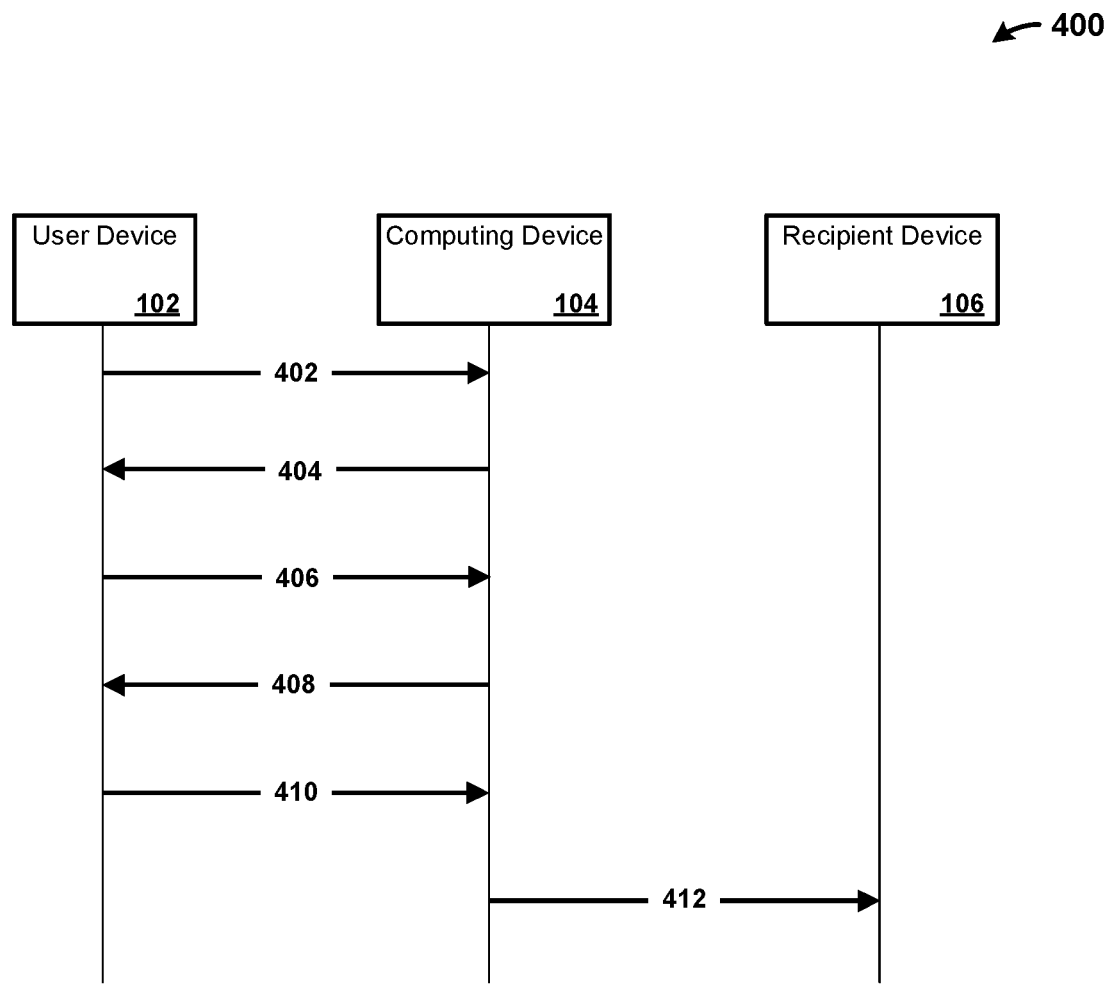
FIG. 4 shows an example sequence for supplementing a message.

FIG. 4 shows an example sequence 400 for modifying/supplementing a message. The sequence 400 may include the user device 102, the computing device 104, and the recipient device 106. At step 402, the user device 102 may send a request to the computing device 104. The request may be sent after an attempt is made by the user device 102 to establish a communication session and/or a communication connection with the recipient device 106. The user device 102 may have failed to establish the communications because the recipient device 106 did not respond (e.g., no answer). The request may be to establish a session with an IVR system of the computing device 104. The user of the user device 102 may interact with the computing device 104 using the IVR system to provide the computing device 104 with a message that the user of the user device 102 would desire to deliver to the recipient device 106.

At step 404, the computing device 104 may send an indication and/or a notification to the user device 102 to determine if the user of the user device 102 desires to modify/supplement the message. The indication and/or the notification may include one or more suggested message options to modify/supplement the message. For example, the computing device 104 may analyze the message sent by the user device 102 to determine contextual information associated with the message. The message from the user device 102 may include the phrase "Happy Birthday!" The computing device 104 may determine one or more suggested message options to modify/supplement the message based on the phrase "Happy Birthday!" occurring within the message. For example, the computing device 104 may determine one or more sounds that may be appropriate to modify/supplement the message with, such as the happy birthday song, a party sound, a sound of confetti popping, and so forth.

At step 406, the user device 102 may send an indication to the computing device 104 of a selection of at least one of the one or more suggested message options to modify/supplement the message. For example, after receiving the one or more suggested message options from the computing device 104, the user of the user device 102 may indicate (e.g., via an input) that the user would like to modify/supplement the message with at least one of the one or more suggested message options. At step 408, the computing device 104 may perform the selected option to modify/supplement the message. The computing device 104 may send the supplemented message to the user device 102, or the computing device 104 may otherwise provide the user device 102 with access to the message (e.g., sending the user device 102 a link to the supplemented message). For example, the computing device 104 may receive the indication from the user device 102, and the computing device 104 may modify the message based on the indication. The computing device 104 may add one or more sounds to the message based on the indication from the user device 102. For example, the indication may indicate that the user device would like to add the song "Happy Birthday" to the message, and the computing device 104 may add the song "Happy Birthday" to the message.

At step 408, the computing device 104 may provide the supplemented message to the user device 102, or the computing device 104 may otherwise provide the user device 102 with access to the message (e.g., sending the user device 102 a link to the supplemented message). The user device 102 may receive the supplemented message, or otherwise access the supplemented message, and playback the supplemented message for the user of the user device 102. At step 410, the user device 102 may send an indication of whether or not the user of the user device 102 accepts the supplemented message to the computing device 104. If the user of the user device 102 does not accept the supplemented message, the computing device 104 may return to step 404 to provide the user device 102 with one or more additional options for modifying/supplementing the message. If the user of the user device 102 accepts the supplemented message, the computing device 104 may send the supplemented message to the recipient device 106, or otherwise provide access thereto, at step 412. After receiving the supplemented message, or otherwise accessing the supplemented message, the recipient device 106 may playback the supplemented message to a user of the recipient device 106.

Figure 5:
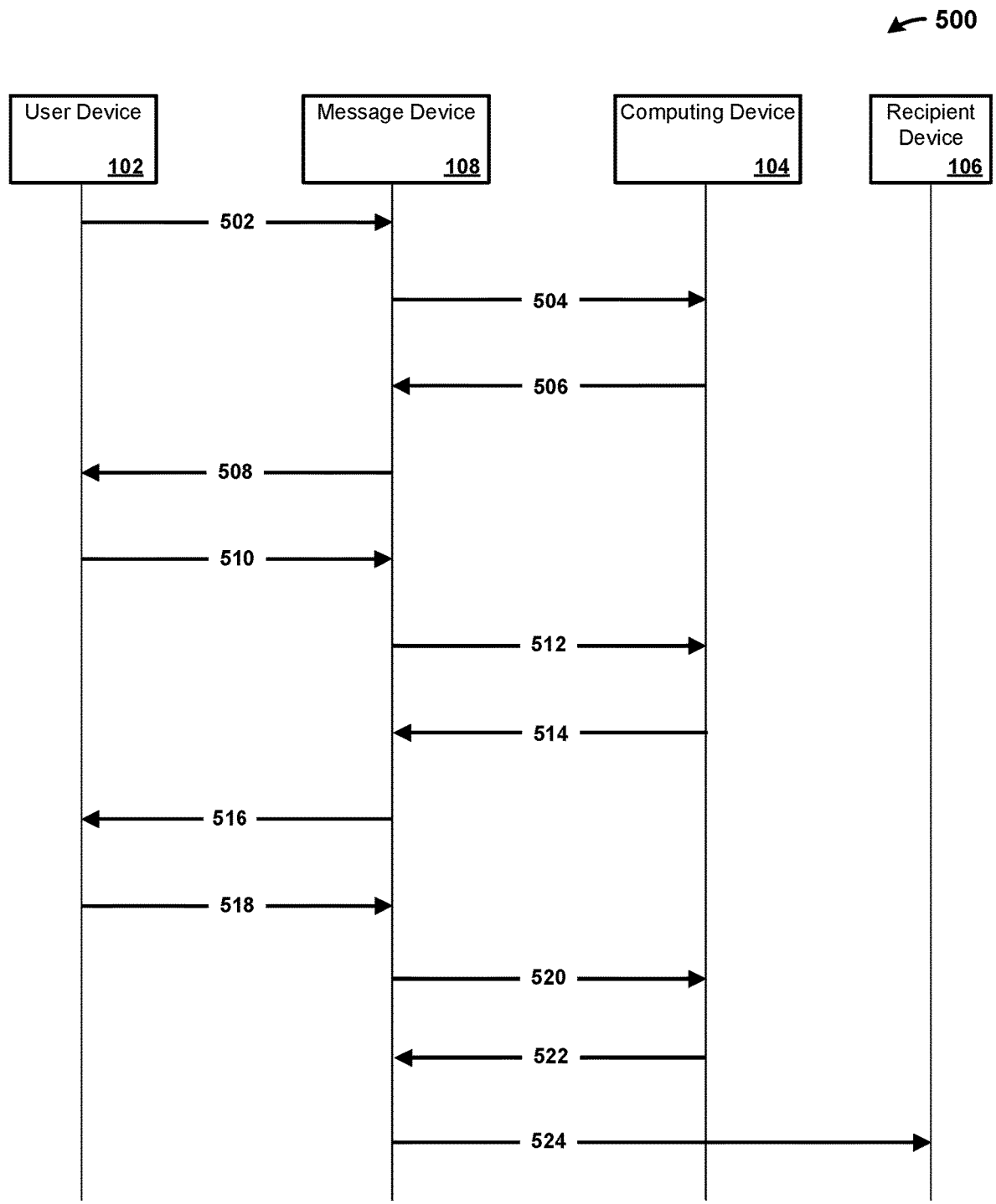
FIG. 5 shows an example sequence for supplementing a message.

FIG. 5 shows an example 500 for modifying/supplementing a message. The example 500 may include the user device 102, the computing device 104, the recipient device 106, and the message device 108. At step 502, the user device 102 establishes a communication connection with the message device 108. The message device 108 may be a voicemail device and/or a video voicemail device configured to record voicemails and/or video voicemails from user devices 102. The user device 102 may establish the communication connection with the message device 108 following a failed attempt by the user device 102 to establish a communication session with the recipient device 106, because the recipient device 106 did not respond (e.g., no answer) to a request to initiate the communication session. The request may be to establish a session with an IVR system of the message device 108. After the user device 102 establishes the communication connection with the message device 108, the user of the user device 102 may interact with the message device 108 using the IVR system to provide the message device 108 with a message that the user of the user device 102 would desire to deliver to the recipient device 106. The user device 102 may provide the message device 108 with the message that the user of the user device 102 desires to deliver to the recipient device 106.

At step 504, the message device 108 may send the message to the computing device 104. The computing device 104 may analyze the message sent by the user device 102 to determine contextual information associated with the message. The message from the user device 102 may include the phrase "Happy Birthday!" The computing device 104 may determine one or more suggested message options (e.g., one or more suggested modifications) to modify/supplement the message based on the phrase "Happy Birthday!" occurring within the message. For example, the computing device 104 may determine one or more sounds that may be appropriate to modify/supplement the message with, such as the happy birthday song, a party sound, a sound of confetti popping, and so forth.

At step 506, the computing device 104 may send an indication and/or a notification to the message device 108 to determine if the user of the user device 102 desires to modify/supplement the message. At step 508, the message device 108 may send the indication and/or notification to the user device 102. For example, the message device 108 may send the one or more suggested message options to modify/supplement the message to the user device 102.

At step 510, the user device 102 may send an indication of a selection of at least one of the one or more suggested message options to modify/supplement the message to the message device 108. For example, after receiving the one or more suggested message options from the message device 108, the user of the user device 102 may indicate (e.g., via an input) that the user would like to modify/supplement the message with at least one of the one or more suggested message options. At step 512, the message device 108 may send the indication to the computing device 104 of the selection of the at least one of the one or more suggested message options to modify/supplement the message.

At step 514, the computing device 104 may perform the selected suggested message option to modify/supplement the message. The computing device 104 may send the supplemented message to the message device 108, or otherwise provide access thereto. For example, the computing device 104 may receive the indication from the message device 108, and may modify the message based on the indication. The computing device 104 may add one or more sounds to the message based on the indication from the user device 102. For example, the indication may indicate that the user device would like to add the song "Happy Birthday" to the message, and the computing device 104 may add the song "Happy Birthday" to the message.

At step 516, the message device 108 may provide the supplemented message to the user device 102, or may otherwise provide access thereto. The user device 102 may receive the supplemented message, or otherwise access the supplemented message, and playback the supplemented message for the user of the user device 102. At step 518, the user device 102 may send an indication of whether or not the user of the user device 102 accepts the supplemented message to the message device 108. If the user device 102 does not accept the supplemented message, the message device 108 may return to step 504 to indicate to the computing device 104 to provide the user device 102 with one or more additional suggested message options for modifying/supplementing the message. If the user of the user device 102 accepts the supplemented message, the message device 108 may send an indication that the user device 102 accepted the supplemental message to the computing device 104.

At step 522, the computing device may send the supplemented message to the message device 108, or otherwise provide access thereto. At step 524, the message device 108 may send the supplemented message to the recipient device 106, or otherwise provide access thereto. After receiving the supplemented message, or otherwise accessing the supplemented message, the recipient device 106 may playback the supplemented message to a user of the recipient device 106.

Figure 6:
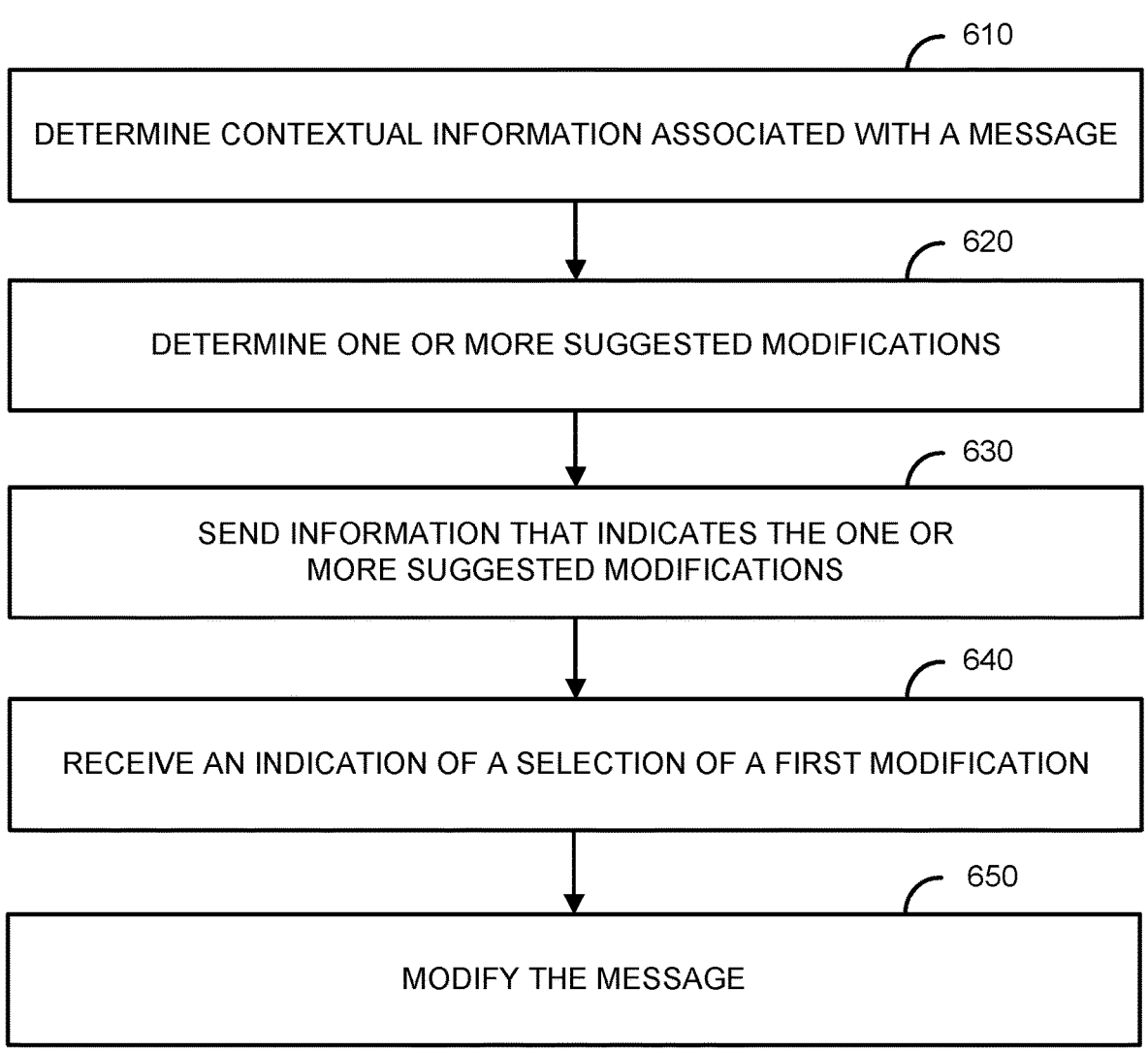
FIG. 6 shows a flowchart of an example method for supplementing a message.

FIG. 6 shows a flowchart of an example method 600 for modifying/supplementing a message. At step 610, contextual information associated with a message may be determined. The contextual information associated with the message may be determined by a computing device (e.g., the computing device 104, the recipient device 106, and/or the message device 108 of FIGS. 1, 2, 3, 4, & 5). The computing device may receive the message from a user device (e.g., the user device 102 of FIGS. 1, 2, 3, 4, & 5) via an interactive voice response ("IVR") system. The message may be intended for another user device (e.g., the recipient device 106 of FIGS. 1, 2, 3, 4, & 5) associated with an intended recipient of the message.

At step 620, one or more suggested message options of a plurality of message options to modify/supplement the message may be determined. The plurality of message options may include a plurality of modifications to be applied to the message. For example, the plurality of modifications may include modifying audio associated with the message, adding a song to the message, or an action to execute based on the message. The computing device may determine the one or more suggested message options (e.g., one or more suggested modifications) of the plurality of message options. The computing device may determine the one or more suggested message options based on a plurality message options to modify/supplement the message. For example, the computing device may rank the plurality of message options to indicate the message option(s) most likely to be selected by the user device. The computing device may determine the one or more suggested message options based on the contextual information. For example, the computing device may analyze language of the message to determine context for one or more words of the message, and the computing device may sort the plurality of message options based on the context of the message. For example, the computing device may utilize natural language processing to determine the contextual information associated with the message. The contextual information may include at least one of a location of the user, a time associated with the message, a date associated with the message, the intended recipient of the message, a subject of the message, or an intent associated with the message. The one or more suggested message options may be determined based on data associated with a plurality of previously selected options. For example, the computing device may utilize historical data that indicates a plurality of previously received messages from a plurality of user devices, as well as the options that the plurality of user devices selected. The one or more suggested message options may be sorted based on a probability that a user of a user device associated with the message will select the one or more suggested message options. The probability may be determined using a trained model, such as the trained model 204.

At step 630, information that indicates the one or more suggested message options may be sent. The computing device may send the information that indicates the one or more suggested message options. For example, the computing device may send data, a message, a notification, and so forth, to the user device. The one or more suggested message options may be sent based on a ranking of the one or more suggested message options which indicates a likelihood a user of the user device will select the one or more suggested options message. The computing device may send the one or more suggested message options based on receiving a request for the one or more suggested message options. The request may be received from the user device.

At step 640, an indication of a selection of a first message option of the one or more suggested message options may be received. The computing device may receive the indication of the selection of the first message option. For example, the user device may send data, a message, a notification, and so forth, to the computing device to indicate the selection of the first message option.

At step 650, the message may be modified. The message may be modified based on the first message option. For example, the computing device may determine/generate a supplemental message that incorporates the first message option. The computing device may determine/generate the supplemental message based on the selection of the first message option. The computing device may determine/generate the supplemental message based on the message. For example, the computing device may modify the message sent by the user device to include supplemental information associated with the first message option.

The computing device may determine/generate a notification associated with the supplemental message. For example, the computing device may determine/generate a notification based on one or more characteristics of the recipient device. The one or more characteristics of the recipient device includes a type of the recipient device, a manufacturer of the recipient device, hardware capabilities of the recipient device, or an account associated with the recipient device. The notification may be a rich notification. The computing device may send the notification associated with the supplemental message to the recipient device.

Figure 7:
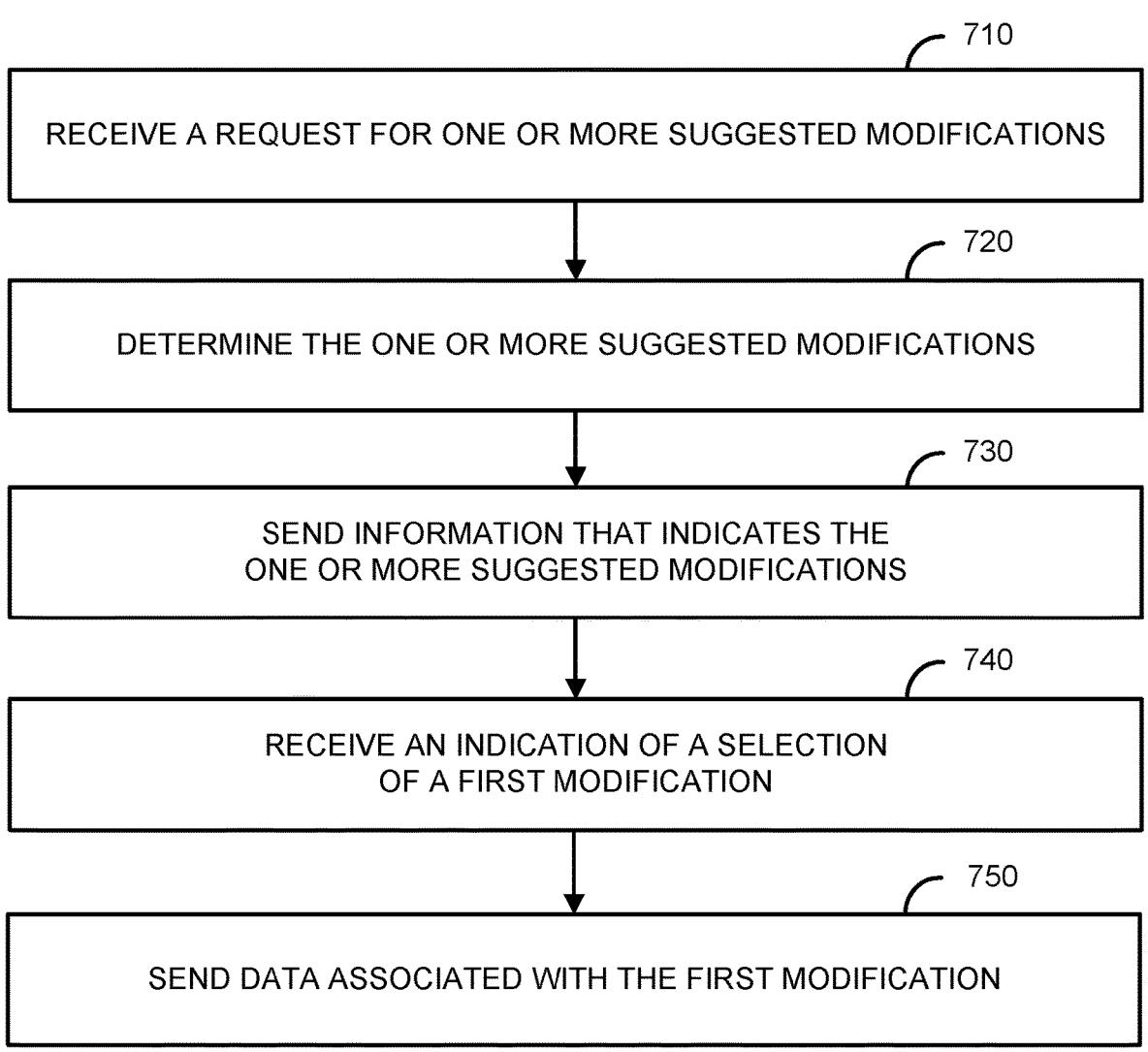
FIG. 7 shows a flowchart of an example method for supplementing a message.

FIG. 7 shows a flowchart of an example method 700 for modifying/supplementing a message. At step 710, a request for one or more suggested message options may be received. The one or more suggested message options may be one or more suggested modifications to be applied to the message. The request for the one or more suggested message options may be received by a computing device (e.g., the computing device 104, the recipient device 106, and/or the message device 108 of FIGS. 1, 2, 3, 4, & 5). The request for the one or more suggested message options may be sent by another device (e.g., the user device 102 and/or the message device 108 of FIGS. 1, 2, 3, 4, & 5). The request may be based on contextual information associated with a message. The message may be intended for a user device associated with an intended recipient of the message. The contextual information may include at least one of a location of the user, a time associated with the message, a date associated with the message, the intended recipient of the message, a subject of the message, or an intent associated with the message At step 720, the one or more suggested message options are determined based on a plurality of previously received requests. The computing device may determine the one or more suggested message options. The one or more suggested message options may include modifying audio associated with the message, adding a song to the message, or an action to execute based on the message. The one or more suggested message options may be sorted based on a probability that a user of a user device associated with the message will select the one or more suggested message options. The one or more message options may be sorted based on the contextual information associated with the message.

At step 730, information that indicates the one or more suggested message options may be sent. The computing device may send the information to the other device or the message device. The information may include supplemental material to be added to the message.

At step 740, an indication of a selection of a first message option of the one or more suggested message options may be received. The computing device may receive the indication of the selection of the first message option. The computing device may modify the data associated with the plurality of previously received requests. The computing device may modify the data to indicate the selection of the first message option based on the contextual information. For example, the computing device may modify the data to increase the likelihood that the first message option will be selected since the user device did select the first message option.

At step 750, data associated with the first message option may be sent. The computing device may send the data associated with the first message option. The computing device may modify the message based on the first message option. For example, the computing device may determine/generate a supplemental message that incorporates the first message option. The computing device may determine/generate the supplemental message based on the selection of the first message option. The computing device may determine/generate the supplemental message based on the message. For example, the computing device may modify the message sent by the user device to include supplemental information associated with the first option.

The computing device may determine (e.g., generate) a notification associated with the supplemental message. For example, the computing device may determine a notification based on one or more characteristics of the recipient device. The one or more characteristics of the recipient device includes a type of the recipient device, a manufacturer of the recipient device, hardware capabilities of the recipient device, or an account associated with the recipient device. The notification may be a rich notification. The computing device may send the notification associated with the supplemental message to the recipient device.

Figure 8:
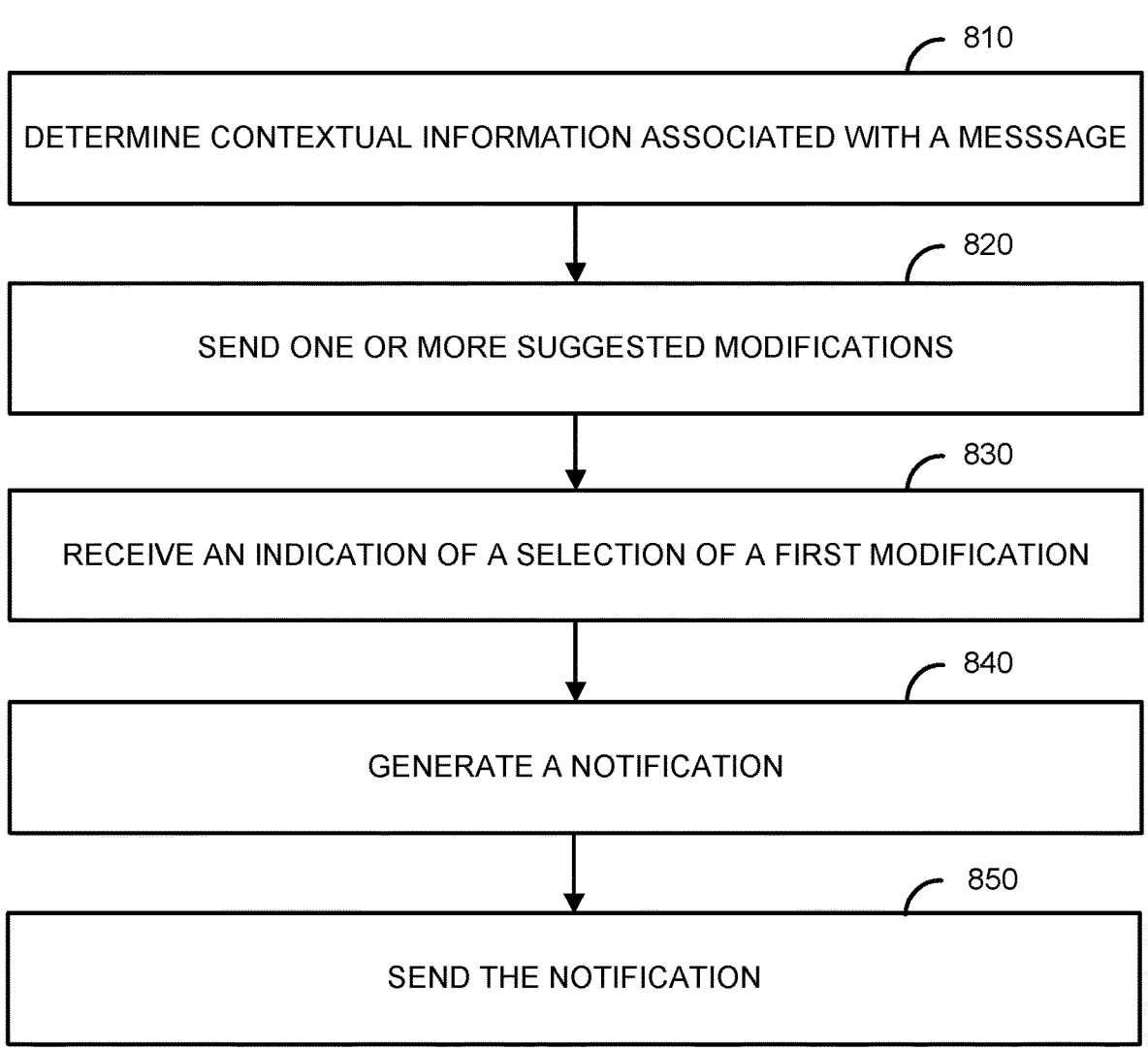
FIG. 8 shows a flowchart of an example method for supplementing a message.

FIG. 8 shows a flowchart of an example method 800 for modifying/supplementing a message. At step 810, contextual information associated with a message is determined. The contextual information associated with the message may be determined by a computing device (e.g., the computing device 104, the recipient device 106, and/or the message device 108 of FIGS. 1, 2, 3, 4, & 5). The message may indicate a recipient device of the message. The computing device may determine one or more suggested message options of a plurality of message options based on the contextual information. The plurality of message options may include a plurality of modifications, and the one or more suggested message options may be one or more suggested modifications of the plurality of modifications. The one or more suggested message options (e.g., the one or more suggested modifications) may be applied to the message. For example, the computing device may analyze content of the message to determine context for one or more words of the message, and the computing device may sort the plurality of message options based on the context of the message. For example, the computing device may utilize natural language processing to determine the contextual information associated with the message. The contextual information may include at least one of a location of the user, a time associated with the message, a date associated with the message, the intended recipient of the message, a subject of the message, or an intent associated with the message.

At step 820, one or more suggested message options of the plurality of message options to modify/supplement the message may be sent. The computing device may send the one or more suggested message options. The computing device may send the one or more suggested message options to the user device. As described herein, the plurality of message options may include the plurality of modifications, and the one or more suggested message options may be the one or more suggested modifications. For example, the one or more suggested message modifications may be sent to the user device. The computing device may determine the one or more suggested message options. The one or more suggested message options may include modifying audio associated with the message, adding a song to the message, or an action to execute based on the message. The one or more suggested message options may be sorted based on a probability that a user of a user device associated with the message will select the one or more suggested message options. The one or more message options may be sorted based on the contextual information associated with the message At step 830, an indication of a selection of a first message option of the one or more suggested message options may be received. The indication of the selection may be received by the user device. The computing device may receive the indication from the user device. The computing device may receive the indication of the selection of the first option. The computing device may modify the data associated with the plurality of previously received requests. The computing device may modify the data to indicate the selection of the first message option based on the contextual information. For example, the computing device may modify the data to increase the likelihood that the first message option will be selected since the user of the user device selected the first message option.

The computing device may modify the message based on the first message option. For example, the computing device may determine/generate a supplemental message that incorporates the first message option. The computing device may determine/generate the supplemental message based on the selection of the first message option. The computing device may determine/generate the supplemental message based on the message. For example, the computing device may modify the message sent by the user device to include supplemental information associated with the first option At step 840, a notification associated with the supplemental message may be generated. The notification may be a rich notification. The computing device may determine/generate a notification associated with the supplemental message. For example, the computing device may determine/generate a notification based on one or more characteristics of the recipient device. The one or more characteristics of the recipient device may include a type of the recipient device, a manufacturer of the recipient device, hardware capabilities of the recipient device, or an account associated with the recipient device.

Figure 9:
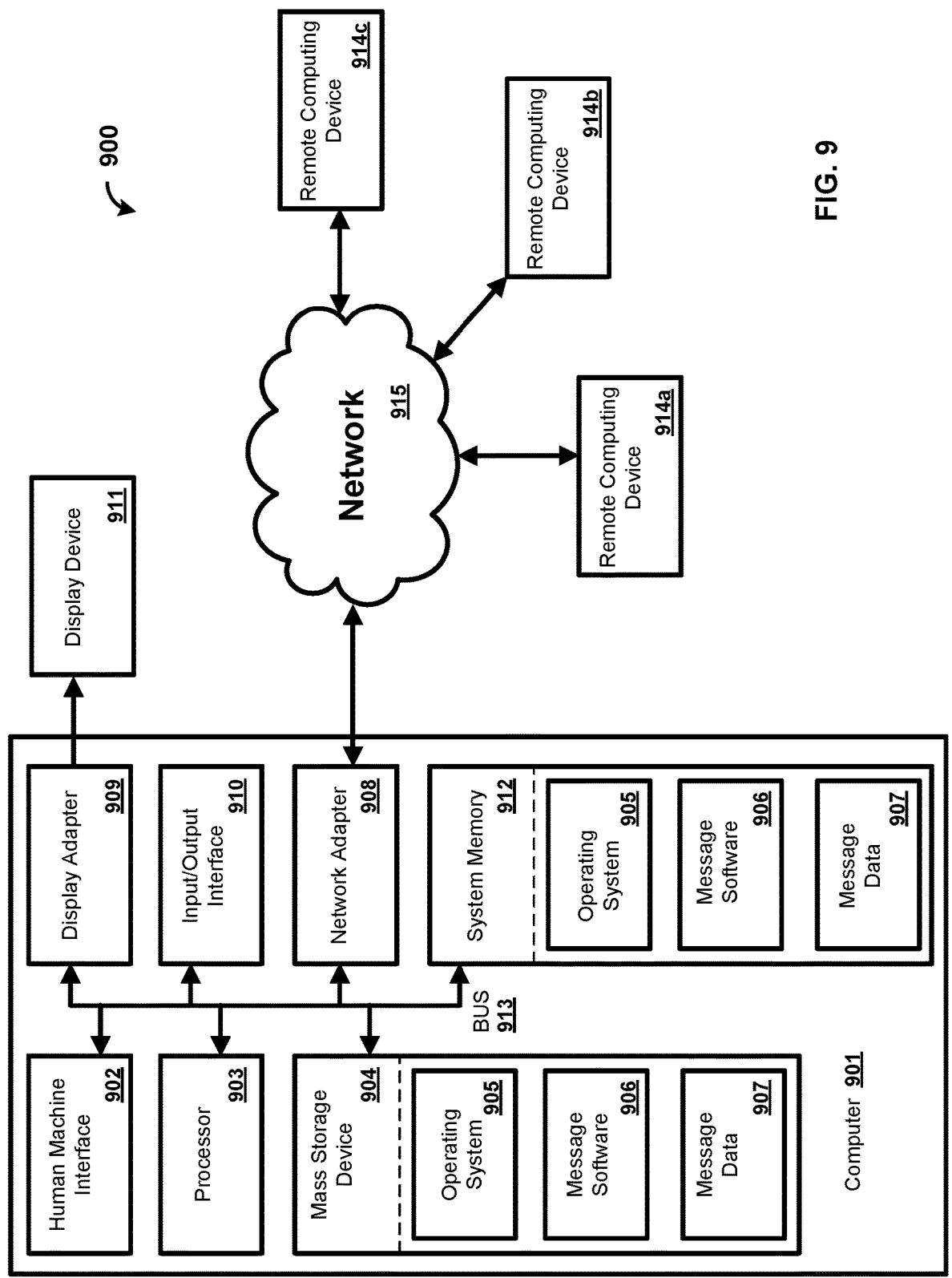
FIG. 9 shows an example block diagram of a computing device for supplementing a message.

At step 850, the notification associated with the supplemental message may be sent. The computing device may send the notification associated with the supplemental message to the recipient device FIG. 9 shows an example system 900 for modifying/supplementing a message. The user device 102, the computing device 104, the recipient device 106, and/or the message device 108 of FIGS. 1, 2, 3, 4, & 5 may be a computer 901 as shown in FIG. 9. The computer 901 may include one or more processors 903, a system memory 912, and a bus 913 that couples various system components including the one or more processors 903 to the system memory 912. In the case of multiple processors 903, the computer 901 may utilize parallel computing. The bus 913 is one or more of several possible types of bus structures, including a memory bus or memory controller, a peripheral bus, an accelerated graphics port, or local bus using any of a variety of bus architectures.

The computer 901 may operate on and/or include a variety of computer readable media (e.g., non-transitory). The readable media may be any available media that is accessible by the computer 901 and may include both volatile and non-volatile media, removable and non-removable media. The system memory 912 has computer readable media in the form of volatile memory, such as random access memory (RAM), and/or non-volatile memory, such as read only memory (ROM). The system memory 912 may store data such as the message data 907 and/or program modules such as the operating system 905 and the message software 906 that are accessible to and/or are operated on by the one or more processors 903.

The computer 901 may also have other removable/non-removable, volatile/non-volatile computer storage media. FIG. 9 shows the mass storage device 904 which may provide non-volatile storage of computer code, computer readable instructions, data structures, program modules, and other data for the computer 901. The mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 904, such as the operating system 905 and the message software 906. Each of the operating system 905 and the message software 906 (or some combination thereof) may include elements of the program modules and the message software 906. The message data 907 may also be stored on the mass storage device 904. The message data 907 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 915.

A user may enter commands and information into the computer 901 via an input device (not shown). Examples of such input devices include, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 903 via a human machine interface 902 that is coupled to the bus 913, but may be connected by other interface and bus structures, such as a parallel port, game port, an IEEE 1394 Port (also known as a Firewire port), a serial port, network adapter 908, and/or a universal serial bus (USB).

The display device 911 may also be connected to the bus 913 via an interface, such as the display adapter 909. It is contemplated that the computer 901 may include more than one display adapter 909 and the computer 901 may include more than one display device 911. The display device 911 may be a monitor, an LCD (Liquid Crystal Display), light emitting diode (LED) display, television, smart lens, smart glass, and/or a projector. In addition to the display device 911, other output peripheral devices may be components such as speakers (not shown) and a printer (not shown) which may be connected to the computer 901 via the Input/Output Interface 910. Any step and/or result of the methods may be output (or caused to be output) in any form to an output device. Such output may be any form of visual representation, including, but not limited to, textual, graphical, animation, audio, tactile, and the like. The display device 911 and computer 901 may be part of one device, or separate devices.

The computer 901 may operate in a networked environment using logical connections to one or more remote computing devices 914a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 901 and a remote computing device 914a,b,c may be made via a network 915, such as a local area network (LAN) and/or a general wide area network (WAN). Such network connections may be through the network adapter 908. The network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components reside at various times in different storage components of the computing device 901, and are executed by the one or more processors 903 of the computer. An implementation of the message software 906 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   determining, based on a voicemail message consisting of voice audio, associated with a user device, contextual information associated with the voice audio;
   determining one or more suggested image additions to the voice audio of the voicemail message based on a relevance between the contextual information associated with the voice audio of the voicemail message and each of the one or more suggested image additions;
   sending, to the user device, an indication of the one or more suggested image additions;
   receiving, from the user device, an indication of a selection of a first image addition of the one or more suggested image additions; and
   modifying, based on the selection of the first image addition, the voicemail message to include the first image addition.

2. The method of claim 1, wherein determining the one or more suggested image additions to the voice audio of the voicemail message based on the contextual information associated with the voice audio further comprises utilizing natural language processing to determine the contextual information associated with the voice audio.

3. The method of claim 1, wherein the contextual information comprises one or more of: a location of a user associated with the user device, a time associated with the voicemail message, a date associated with the voicemail message, an intended recipient of the voicemail message, a subject of the voicemail message, or an intent associated with the voicemail message.

4. The method of claim 1, wherein the one or more suggested image additions comprises one or more of: a modification of audio content in the voicemail message, an addition of one or more images to content in the voicemail message, or execution of an action based on the voicemail message.

5. The method of claim 1, further comprising causing the modified voicemail message to be sent to a recipient device.

6. The method of claim 1, wherein determining the one or more suggested image additions comprises:
   training, based on data associated with a plurality of previously selected image additions, a model; and
   determining, based on the trained model, that a user of the user device will select each of the one or more suggested image additions.

7. The method of claim 1, further comprising:
   generating, based on the modified voicemail message, comprising the first image addition, and one or more characteristics of a recipient device, a notification associated with the modified voicemail message; and
   sending, to the recipient device, the notification associated with the modified voicemail message.

8. A method comprising:
   receiving, from a computing device, a request for one or more suggested image additions of a plurality of image additions to add additional content to a voicemail message consisting of voice audio;
   determining, based on content in the voicemail message and a trained model, the one or more suggested image additions to add to the content of the voicemail message;
   sending, to the computing device, an indication of the one or more suggested image additions;

receiving, from the computing device, an indication of a selection of a first image addition of the one or more suggested image additions; and sending, to the computing device and based on the selection of the first image addition, one or more images associated with the first image addition.

9. The method of claim 8, wherein the trained model is trained using natural language processing and data associated with a plurality of previously received requests, and wherein the method further comprises modifying, based on the indication of the selection of the first image addition, the data associated with the plurality of previously received requests to indicate the selection of the first image addition based on the content in the voicemail message.

10. The method of claim 8, further comprising utilizing natural language processing to determine the content of the voicemail message.

11. The method of claim 8, wherein the plurality of image additions comprises one or more of: an addition of one or more images to the content in the voicemail message or an execution of an action based on the voicemail message.

12. The method of claim 8, wherein receiving, from the computing device the indication of the selection of the first image addition comprises receiving the indication from a user device via the computing device, the method further comprising:

modifying, based on the selection of the first image addition, audio data of the voicemail message to add the first image addition to the content of the voicemail message.

13. The method of claim 12, wherein sending the one or more images associated with the first image addition comprises:

generating, based on the modified voicemail message and based on one or more characteristics of a recipient device, a notification associated with the modified voicemail message; and sending, to the recipient device, the notification associated with the modified voicemail message.

14. A method comprising:

determining, based on content of a voicemail message consisting of voice audio, one or more suggested image additions;

sending, to a user device, the one or more suggested image additions to add to the voicemail message;

receiving, from the user device, an indication of a selection of a first image addition of the one or more suggested image additions to add to the voicemail message;

modifying, based on the selection of the first image addition, the voicemail message; and sending, to a recipient device, a notification associated with the modified voicemail message.

15. The method of claim 14, further comprising generating, based on one or more characteristics of the recipient device, the notification, wherein the one or more characteristics of the recipient device comprises one or more of: a type of the recipient device, a manufacturer of the recipient device, hardware capabilities of the recipient device, or an account associated with the recipient device.

16. The method of claim 14, wherein determining, based on the content of the voicemail message, the one or more suggested image additions further comprises utilizing natural language processing to determine the content of the voicemail message.

17. The method of claim 14, wherein the one or more suggested imagecontent additions comprises at least one of: a modification of audio in the voicemail message or execution of an action based on the voicemail message.

18. The method of claim 14, further comprising:

determining, based on the content of the voicemail message and a trained model, the one or more suggested image additions, wherein the trained model sorts a plurality of image additions to determine the one or more suggested image additions based on the content of the voicemail message and one or more association rules.

19. The method of claim 14, further comprising sending to the recipient device the modified voicemail message.

20. The method of claim 1, wherein the first image addition is supplemental to an original content of the voicemail message.

21. The method of claim 1, further comprising receiving, from the user device and based on a failed attempt by the user device to connect to a recipient device, the voicemail message.

22. The method of claim 14, further comprising receiving, from the user device and based on a failed attempt by the user device to connect to the recipient device, the voicemail message.

* * * * *